S. DENNIS.
FRUIT TREE VENTILATOR.
APPLICATION FILED SEPT. 25, 1911.
1,011,170.
Patented Dec. 12, 1911.
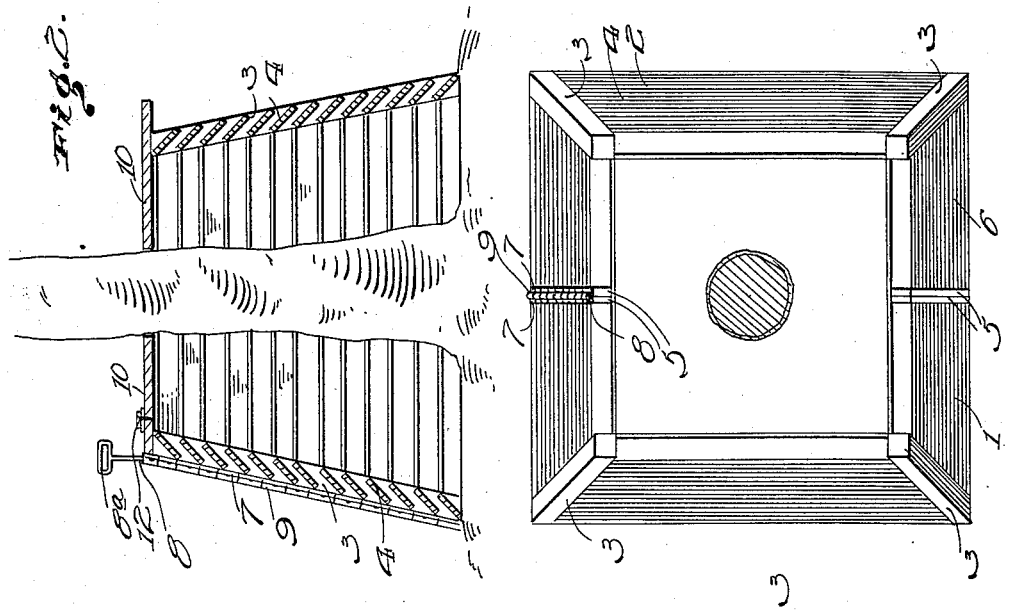
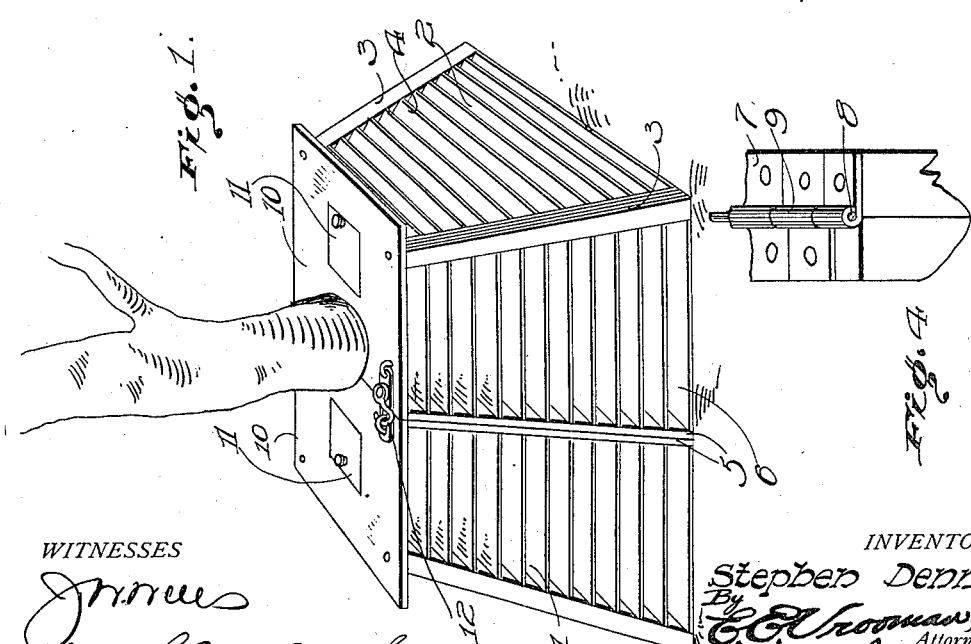
WITNESSES
INVENTOR
Stephen Dennis
By
Attorney

UNITED STATES PATENT OFFICE.

STEPHEN DENNIS, OF JONESBORO, ARKANSAS.

FRUIT-TREE VENTILATOR.

1,011,170.   Specification of Letters Patent.   Patented Dec. 12, 1911.

Application filed September 25, 1911. Serial No. 651,085.

*To all whom it may concern:*

Be it known that I, STEPHEN DENNIS, a citizen of the United States, residing at Jonesboro, in the county of Craighead and State of Arkansas, have invented certain new and useful Improvements in Fruit-Tree Ventilators, of which the following is a specification, reference being had therein to the accompanying drawing.

This invention relates to fruit tree ventilators and has for its object the production of a device for containing snow or other material closely around the tree so as to prevent the sap in fruit trees and the like from rising when the weather should become moderate.

Another object of this invention is the production of a ventilator which may be easily placed around a tree and detached therefrom.

With these and other objects in view this invention consists of certain novel constructions, combinations, and arrangements of parts, as will be hereinafter fully described and claimed.

In the drawings: Figure 1 is a perspective view of the ventilator attached to a tree. Fig. 2 is a vertical section thereof. Fig. 3 is a top plan view of the device with the top coverings removed. Fig. 4 is an enlarged fragmentary view of the rear hinge portion for the two sections of the ventilator.

Referring to the drawings by numerals 1 designates the primary section of the ventilator and 2 the auxiliary section. These two sections are hingedly secured near their rear ends as illustrated in Fig. 2, and each of these sections comprises a pair of corner braces 3 which are connected by means of slats 4. The adjacent ends of the sections 1 and 2 comprise a pair of members 5 which are held in spaced relation from the corner braces 3 by means of slats 6. The rear members 5 are provided with a plurality of hinge sections 7 and a pintle or rod 8 extends through the barrel portions 9 thereof. A handle portion 8ª is formed upon the pintle 8 for allowing the same to be readily withdrawn from the barrel portions 9 of the hinges 7 when it is desired to detach the sections so that the same may be stowed away or placed in condition for shipment. It will therefore be obvious that the two sections are hingedly secured together so that the same may be spread apart when it is desired to detach the frame or ventilator proper from the tree. A top 10 is secured to each of the sections and a door 11 is formed in the top of each section for allowing the material to be placed within the ventilator for keeping the base of the tree chilled. The two sections are locked around the tree by means of the ordinary hasp and hook 12 as illustrated in Fig. 1.

From the foregoing, it will be obvious that an efficient device has been produced for keeping the base of a fruit tree, or other tree, chilled thereby preventing the sap from rising as previously stated when the temperature should rise for a short time.

It will be obvious that crushed ice, snow or in fact any other material may be placed within the ventilator and through the medium of the slats it will be obvious that a free circulation of air may take place through the ventilator.

By the use of the present device the tree will not begin to blossom during an advance season and then be likely to have the fruit killed by a subsequent cold spell which very often happens especially in view of the fact that the snow or ice may be packed within the ventilator and will be preserved for a considerable length of time without the necessity of renewing the same.

What I claim is:—

1. A tree ventilator of the class described comprising a primary and auxiliary section, said sections being hingedly connected at their rear, a top fixedly secured to each of said sections, means carried by said top for holding said sections in a closed position around a tree, and doors positioned within said tops for allowing access to be had to the interior of the ventilator.

2. A tree ventilator of the class described comprising primary and auxiliary sections tapering toward their upper ends, each of said sections comprising corner braces, slats positioned between said corner braces and corner braces and end braces, a top closing the upper end of each of said sections, means for hingedly securing said sections together, and doors carried by the top of each section for allowing access to be had to the interior thereof.

In testimony whereof I hereunto affix my signature in presence of two witnesses.

STEPHEN DENNIS.

Witnesses:
 H. L. WILLIAMS,
 ARCHER WHEATLEY.

---

Copies of this patent may be obtained for five cents each, by addressing the "Commissioner of Patents, Washington, D. C."